United States Patent
Gao et al.

(10) Patent No.: US 11,954,525 B1
(45) Date of Patent: Apr. 9, 2024

(54) METHOD AND APPARATUS OF EXECUTING COLLABORATIVE JOB FOR SPARK FACED TO MULTIPLE K8S CLUSTERS

(71) Applicant: ZHEJIANG LAB, Hangzhou (CN)

(72) Inventors: Feng Gao, Hangzhou (CN); Wenyuan Bai, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/554,450

(22) PCT Filed: Apr. 13, 2023

(86) PCT No.: PCT/CN2023/088148
§ 371 (c)(1),
(2) Date: Oct. 6, 2023

(30) Foreign Application Priority Data

Sep. 21, 2022  (CN) .......................... 202211148298.1

(51) Int. Cl.
*G06F 9/46* (2006.01)
*G06F 9/48* (2006.01)
*G06F 9/50* (2006.01)

(52) U.S. Cl.
CPC .......... *G06F 9/4881* (2013.01); *G06F 9/5022* (2013.01)

(58) Field of Classification Search
CPC .................................................... G06F 9/4881
(Continued)

(56) References Cited

U.S. PATENT DOCUMENTS

| 8,682,998 B2 * | 3/2014 | Reddy Byreddy .... G06Q 10/06 709/208 |
| 9,430,264 B2 * | 8/2016 | Tang ................... G06F 9/45545 |

(Continued)

FOREIGN PATENT DOCUMENTS

| CN | 103713942 | 4/2014 |
| CN | 103744734 | 4/2014 |

(Continued)

OTHER PUBLICATIONS

Bahareva et al., "Researching a Distributed Computing Automation Platform for Big Data Processing," 2020 International Conference Engineering and Telecommunication, Nov. 25-26, 2020, 5 pages.

(Continued)

*Primary Examiner* — Mehran Kamran
(74) *Attorney, Agent, or Firm* — Fish & Richardson P.C.

(57) ABSTRACT

The present disclosure discloses Spark collaborative computing, job method and apparatus for multiple K8s clusters, and addresses the problem that most of the current multiple K8s clusters adopt the model of federated clusters, and Spark's own method of scheduling and optimization cannot be implemented across domains, by implementing a cross-domain job method, setting the multiple K8s clusters as a master cluster and a slave cluster, with the master cluster being responsible for creating Spark's The master cluster is responsible for creating Spark's Driver container and Pods, and the slave cluster is responsible for creating Spark's Executor container and Pods. After the containers are created, a direct tunnel is established between the master cluster and the slave cluster by aggregating address information and access credentials through the Collaboration Center, and the containers in the slave cluster register with Driver and continuously send heartbeat messages through the tunnel.

8 Claims, 5 Drawing Sheets

(58) Field of Classification Search
USPC ........................................................ 718/106
See application file for complete search history.

(56) References Cited

U.S. PATENT DOCUMENTS

| | | | |
|---|---|---|---|
| 2009/0265541 A1* | 10/2009 | Ylitalo | H04L 61/103 |
| | | | 713/151 |
| 2010/0223618 A1* | 9/2010 | Fu | G06F 9/5077 |
| | | | 718/102 |
| 2012/0221886 A1* | 8/2012 | Barsness | G06F 11/1482 |
| | | | 714/4.2 |
| 2013/0036423 A1* | 2/2013 | McCready | G06F 9/5066 |
| | | | 718/103 |
| 2014/0173618 A1* | 6/2014 | Neuman | G06F 9/5066 |
| | | | 718/104 |
| 2014/0201759 A1* | 7/2014 | Amikura | G06F 3/1241 |
| | | | 718/106 |
| 2016/0050262 A1* | 2/2016 | Kumar | H04L 43/0823 |
| | | | 709/204 |
| 2017/0235603 A1* | 8/2017 | Baughman | G06Q 10/101 |
| | | | 718/105 |
| 2018/0241804 A1* | 8/2018 | Calo | G06F 9/466 |
| 2018/0373540 A1* | 12/2018 | Bao | G06F 9/5038 |
| 2019/0132203 A1* | 5/2019 | Wince | G06F 9/542 |
| 2019/0171494 A1* | 6/2019 | Nucci | G06N 20/00 |
| 2019/0250958 A1* | 8/2019 | Kumar | G06F 9/5072 |
| 2019/0394093 A1* | 12/2019 | Kulkarni | H04L 41/0893 |
| 2020/0142712 A1* | 5/2020 | Liu | G06F 9/4498 |
| 2020/0192690 A1* | 6/2020 | Gupta | H04L 67/34 |
| 2020/0326988 A1* | 10/2020 | Lee | G06F 9/44584 |
| 2021/0216370 A1* | 7/2021 | Sciarrino | G06N 20/00 |
| 2021/0311655 A1* | 10/2021 | Benjamin | G06F 3/0631 |
| 2021/0374564 A1* | 12/2021 | Kaspa | G06F 9/5072 |
| 2022/0337417 A1* | 10/2022 | Sanders | H04L 9/0643 |
| 2023/0222004 A1* | 7/2023 | Wang | G06F 9/5077 |
| | | | 718/104 |

FOREIGN PATENT DOCUMENTS

| | | |
|---|---|---|
| CN | 109033000 | 12/2018 |
| CN | 110308984 | 10/2019 |
| CN | 110347489 | 10/2019 |
| CN | 111767092 | 10/2020 |
| CN | 113014625 | 6/2021 |
| CN | 113835834 | 12/2021 |
| CN | 114942826 | 8/2022 |
| CN | 115086312 | 9/2022 |
| CN | 115086330 | 9/2022 |
| CN | 115242877 | 1/2023 |
| WO | WO 2021175152 | 9/2021 |
| WO | WO 2022001209 | 1/2022 |

OTHER PUBLICATIONS

Cui et al., "Research and design on ECCSSM distributed scheduler for multi-clusters" Journal of Computer Applications, Jun. 2009, 4 pages (with English Abstract).

Du et al., "Parallel CART Decision Tree Algorithm on Big Data Platform," Journal of China West Normal University(Natural Sciences), Jun. 2021, 42(2), 6 pages (with English Abstract).

International Search Report and Written Opinion in International Appln. No. PCT/CN2023/088148, dated Aug. 8, 2023, 8 pages (with English translation).

Tian et al., "A method for Improving the Performance of Spark on Container Cluster Based on Machine Learning, " Netinfo Security, 19(4):11-19 (with English Abstract).

* cited by examiner

METHOD AND APPARATUS OF EXECUTING COLLABORATIVE JOB FOR SPARK FACED TO MULTIPLE K8S CLUSTERS

CROSS REFERENCE TO RELATED APPLICATIONS

This application is a US National Phase of a PCT Application No. PCT/CN2023/088148 filed on Apr. 13, 2023, which claims a priority to Chinese Patent Application No. CN202211148298.1, filed on Sep. 21, 202, the entire contents of which are incorporated herein by reference in their entireties.

TECHNICAL FIELD

The present disclosure relates to the technology field of cloud computing and big data, and in particular to, a method and an apparatus of executing collaborative compute and job for Spark faced to multiple K8s clusters.

BACKGROUND

Apache Spark is a fast and general computer engine, designed specifically for processing of large-scale data. The Spark was started in 2009 at the Algorithms, Machines and People lab (AMP lab) of the UC Berkeley and became an open source in 2010. In 2013, the Spark was donated to the Apache Software Foundation and became a top-level project of the Apache in 2014. At present, the Spark is one of the go-to tools for enterprises and research organizations, and the mature applications accumulated by the Spark platform have become an important asset for the data industry.

The K8s (Kubernetes) is an open-source scheduling-arranging-platform of the container. As Kubernetes is applied to service abstraction, and to support naming and load balancing, and organizes scheduling Pods of the multiple containers through tags, better flexibility, availability, and load balance are achieved. Therefore, in the process of Cloud Native technology development, the Kubernetes has become the current operating system in the cloud-era accompany with the development of container technology. The Kubernetes, as the de facto standard in the field of arranging the container and a key item in the cloud-native field, has been the core technology that engineers need to understand and practice most in the era of cloud-native.

The emergence of complex applications represented by the big data and the intelligent computing with big models makes it difficult for single-cluster resource to be competent for super-large and complex computing jobs, especially for the complex computing job related to the big data, which require a larger scale data center. However, the data center lacks elasticity capability, and waste of resources generally exist to ensure that the business is able to responds to situation such as an unexpected request, etc. The current multi-Kubernetes clusters mostly adopt the federated cluster model, and the method of scheduling and optimizing of the Spark itself cannot be implemented across domains.

SUMMARY

In order to address the deficiencies of the prior art and achieve the purpose of handling complex computing job for Spark by efficiently collaborating the computing power of multiple clusters together, the present disclosure adopts the following technical solutions.

In present disclosure, a method of executing a collaborative job faced to multiple clusters is provided, applied to a collaboration center, including the following steps.

Step S101: specifying, based on status information of a job submitted by a user, a master cluster, and a slave cluster.

The job is a set of works that the user requires a computer system to do in a single solution or a transaction process, which includes a user program, a required control command for a data set, etc. The job is composed of a series of sequential steps, and compute and storage in multiple network nodes may be involved in the execution of the job. The job status information includes the user-selected policy and the computing resource, data storage, etc.

Step S102: sending a job description file to the master cluster to enable the master cluster to create a driver Pod; and sending the job description file to the slave cluster to enable the slave cluster to create an executor Pod of the slave cluster.

Step S103: receiving registration information for the driver Pod from the master cluster to complete a registration of the driver Pod in the collaboration center; enabling the slave cluster to send registration information to the registered driver Pod to complete a registration of the executor Pod of the slave cluster in the driver Pod, such that the registered executor Pod of the slave cluster executes the job sent by the master cluster.

while the collaboration center receives the registration information for the driver Pod from the master cluster, the collaboration center further sends a reverse proxy start request to the master cluster, and based on feedback information established by the executor Pod of the slave cluster, enables the driver Pod to determine establishment information of the executor Pod of the slave cluster to enable a reverse proxy unit, such that the slave cluster sends address information and credentials information of the executor Pod of the slave cluster to connect with the reverse proxy unit of the master cluster; and in response to determining that the slave cluster connects successfully with the reverse proxy unit of the master cluster, the slave cluster sends the registration information to the driver Pod to complete the registration of the of executor Pod of the slave cluster in the driver Pod.

Step S104: after an execution of the job is completed, releasing resources occupied by executing the job.

Further, in the step S101, the collaboration center determines whether a single cluster operates based on the job status information submitted by the user, and in response to determining that a single cluster operates, the collaboration center selects a single cluster to execute the job and releases resources occupied after the job is completed, and in response to determining that two or more clusters operate, the collaboration center specifies the master cluster and the slave cluster, and executes the step S102.

Further, in the step S102, after sending the job description file to the master cluster to enable the master cluster to start executing a job, enabling the master cluster to establish an executor Pod of the master cluster; and in the step S103, after receiving the registration information for the driver Pod from the master cluster to complete the registration of the driver Pod in the collaboration center, enabling the executor Pod of the master cluster to send registration information for the executor Pod of the master cluster to the registered driver Pod to complete a registration of the executor Pod of the master cluster in the driver Pod, such that the executor Pod of the master cluster executes the job sent by the master cluster.

A user-defined protocol is implemented based on the reverse proxy, such that the direct communication between multiple clusters across the domain in a single computing task is achieved, forwarding through a third party is avoided in this method, and the effective communication is achieved.

Further, in the step S103, while enabling the slave cluster to send registration information to the driver Pod, enabling the slave cluster to send a heartbeat message to the master cluster, such that the master cluster determines whether connection between the master cluster and the slave cluster is successful based on the registration information of the slave cluster and the heartbeat message; where in response to determining that the master cluster receives the registration information for the group of executor Pods of the slave cluster and the heartbeat message, the connection is successful, and sends the job to the slave cluster; in response to determining that the master cluster does not receive at least one of the registration information for the group of executor Pods of the slave cluster or the heartbeat message, the connection is unsuccessful and continue waiting.

In present disclosure, an apparatus of executing a collaborative job faced to multiple clusters is provided, including: a job interface module, a job assignment module and a resource interface module, wherein the job assignment module comprises a cluster designation module, a job description file sending module, a registration information sending module and a resource releasing module.

The job interface module is configured to obtain a job submitted by a user.

The cluster designation module is configured to specify a master cluster and a slave cluster based on the job status information submitted by the user.

The job description file sending module is configured to send a job description file to the master cluster to enable the master cluster to create a driver Pod; and send the job description file to the slave cluster to enable the slave cluster to create an executor Pod of the slave cluster.

The registration information sending module is configured to send registration information for the driver Pod to the master cluster to complete a registration of the driver Pod in a collaboration center; enable the slave cluster to send registration information to the registered driver Pod to complete a registration of the executor Pod of the slave cluster in the driver Pod, such that the executor Pod of the slave cluster executes the job sent by the master cluster.

While the collaboration center receives the registration information for the driver Pod from the master cluster, the collaboration center further sends a reverse proxy start request to the master cluster, and based on feedback information established by the group of executor Pods of the slave cluster, the collaboration center enables the driver Pod to determine establishment information of the group of executor Pods of the slave cluster to enable a reverse proxy unit, such that the slave cluster sends address information and credentials information of the group of executor Pods of the slave cluster to the master cluster, to connect with the reverse proxy unit of the master cluster; and in response to determining that the slave cluster connects successfully with the reverse proxy unit of the master cluster, the slave cluster sends the registration information for the group of executor Pods of the slave cluster to the driver Pod to complete the registration of the group of executor Pods of the slave cluster in the driver Pod.

The resource releasing module is configured to release resources occupied by executing the job after an execution of the job is completed.

The resource interface module is configured to obtain statuses for resources of respective clusters.

In present disclosure, a method of executing a collaborative job faced to multiple clusters is provided, applied to a master cluster, including the following steps.

Step S201: in response to obtaining a job description file sent by a collaboration center, creating a driver Pod.

Step S202: sending registration information for the driver Pod to collaboration center to complete a registration of the driver Pod in the collaboration center; by the registered driver Pod, obtaining registration information from the executor Pods of the slave cluster, to complete a registration of the executor Pods of the slave cluster in the driver Pod; wherein the executor Pods of the slave cluster are created by the slave cluster based on the job description file obtained from the collaboration center.

While the master cluster sends the registration information for the driver Pod to the collaboration center, the master cluster further obtains a reverse proxy start request; and based on feedback information established by the group of executor Pods of the slave cluster, the driver Pod is enabled to determine establishment information of the group of executor Pods of the slave cluster to enable a reverse proxy unit; such that the slave cluster sends address information and credentials information of the group of executor Pods of the slave cluster to connect with the reverse proxy unit of the master cluster; in response to determining that the slave cluster connects successfully with the reverse proxy unit of the master cluster, the slave cluster sends the registration information for the group of executor Pods of the slave cluster to the driver Pod to complete the registration of the group of executor Pods of the slave cluster in the driver Pod.

Step S203: sending a job to the registered slave cluster to enable the registered executor Pods of the slave cluster to execute the job.

In present disclosure, a method of executing a collaborative job faced to multiple clusters is provided, applied to a slave cluster, including the following steps.

Step S301: in response to obtaining a job description file sent by the collaboration center, creating executor Pods.

Step S302: sending registration information to a registered driver Pod, to complete a registration of the executor Pods of the slave cluster in the driver Pod; where the driver Pod is established by a master cluster based on the job description file received from the collaboration center; and a registration of the driver Pod is completed at the collaboration center based on registration information for the driver Pod received by the collaboration center from the master cluster.

Step S303; obtaining a job sent by the master cluster, and executing the job by the executor Pods of the slave cluster.

In present disclosure, a method of executing a collaborative job for Spark faced to multiple K8s clusters is provided, applied to a collaboration center, including the following steps.

Step S401: specifying a K8s master cluster and K8s slave clusters based on job status information of Spark computer engine submitted by a user.

Step S402: sending a Yaml file for describing a job to a K8s API interface of the K8s master cluster, such that the K8s master cluster calls, after receiving a request submitted by the Spark computer engine, a command of spark-submit to start the job, and creates a single Spark driver Pod; and sending the Yaml file for describing the job to the K8s slave clusters to enable the K8s slave clusters to create Spark executor Pods of the K8s slave clusters.

That a single Spark Driver utilizes computing resources from different Kubernetes clusters to complete the computing job is realized, unlike the implementation method based on Kubernetes Fed, this method does not generate multiple Spark Drivers and enables the resources of multiple clusters to be transparent to Spark's computing process.

Step S403: receiving registration information for the Spark driver Pod from the K8s master cluster to complete a registration of the Spark driver Pod in the collaboration center, enabling the K8s slave clusters to send registration information to the registered Spark driver Pod to complete a registration of the Spark executor Pods of the slave clusters in the Spark driver Pod, such that the registered Spark executor Pods of the K8s slave clusters execute the job sent by the K8s master cluster in configuration with the Spark driver Pod.

While the collaboration center receives the registration information for the Spark driver Pod from the K8s master cluster, the collaboration center further sends a reverse proxy start request to the K8s master cluster; and based on feedback information established by the Spark executor Pods of the K8s slave clusters, the collaboration center enables the Spark driver Pod to determine establishment information of the Spark executor Pods of the K8s slave clusters to enable a reverse proxy unit, such that the K8s slave clusters send address information and credentials information of the Spark executor Pods of the K8s slave clusters to connect with the reverse proxy unit of the K8s master cluster; and in response to determining that the K8s slave clusters connect successfully with the reverse proxy unit of the K8s master cluster, the K8s slave clusters send the registration information for the Spark executor Pods of the K8s slave clusters to the Spark driver Pod to complete the registration of the Spark executor Pods of the K8s slave cluster in the Spark driver Pod.

Step S404: after an execution of the job is completed, releasing resources occupied by executing the job.

In present disclosure, an apparatus of executing a collaborative job for Spark faced to multiple K8s clusters is provided, including: a job interface module, a job assignment module, and a resource interface module, where the job assignment module includes a K8s cluster designation module, a Yaml job description file sending module, registration information sending module and a resource releasing module.

The job interface module is configured to obtain a job submitted by a user.

The K8s cluster designation module is configured to specify a K8s master cluster and K8s slave clusters based on job status information of Spark computer engine submitted by the user.

The Yaml job description file sending module is configured to send a Yaml file for describing a job to the K8s API interface of the K8s master cluster, such that the K8s master cluster calls, after receiving a request submitted by the Spark computer engine, a command of spark-submit to start the job, and creates a single Spark driver Pod; and send the Yaml file for describing the job to the K8s slave clusters to enable the K8s slave clusters to create Spark executor Pods of the K8s slave clusters.

That a single Spark Driver utilizes the computing resource from different Kubernetes clusters to complete the computing job is realized, unlike the implementation method based on Kubernetes Fed, this method does not generate multiple Spark Drivers and enables the resources of multiple clusters to be transparent to Spark's computing process.

The registration information sending module is configured to receive the registration information for the Spark driver Pod from the K8s master cluster to complete a registration of the Spark driver Pod in the collaboration center, enable the K8s slave clusters to send registration information to the registered Spark driver Pod to complete a registration of the Spark executor Pods in the Spark driver Pod, such that the registered Spark executor Pods of the slave clusters execute the job sent by the K8s master cluster in configuration with the Spark driver Pod.

While the collaboration center receives the registration information for the Spark driver Pod from the K8s master cluster, the collaboration center further sends a reverse proxy start request to the K8s master cluster; and based on feedback information established by the Spark executor Pods of the K8s slave clusters, the collaboration center enables the Spark driver Pod to determine establishment information of the Spark executor Pods of the K8s slave clusters to enable a reverse proxy unit, such that the K8s slave clusters send address information and credentials information of the Spark executor Pods of the K8s slave clusters to connect with the reverse proxy unit of the K8s master cluster; and in response to determining that the K8s slave clusters connect successfully with the reverse proxy unit of the K8s master cluster, the K8s slave clusters send the registration information for the Spark executor Pods of the K8s slave clusters to the Spark driver Pod to complete the registration of the Spark executor Pods of the K8s slave cluster in the Spark driver Pod.

The resource releasing module is configured to release resources occupied by executing the job, after an execution of the job is completed.

The resource interface module is configured to obtain statuses for resources of respective clusters.

The advantages and beneficial effects of the present disclosure may include:

in the present disclosure, methods and apparatuses of executing a collaborative computing and job for Spark faced to multiple K8s clusters are provided. Through a single Spark driver unit, utilizing the computing resources of multiple different Kubernetes slave clusters, the computing job is completed. Unlike the prior art, in the present disclosure, multiple driver Pods may not be generated, and the transparency of the resources of multiple clusters to the computing process of Spark is realized. Therefore, that the computing power of multiple clusters are collaborated together effectively to execute complex Spark computing jobs is realized.

DETAILED DESCRIPTION

Specific embodiments of the present disclosure will be described in detail herein in conjunction with the drawings. It should be understood that the specific embodiments described herein are only intended to illustrate and explain the present disclosure rather than limit the present disclosure.

Figure 1A:
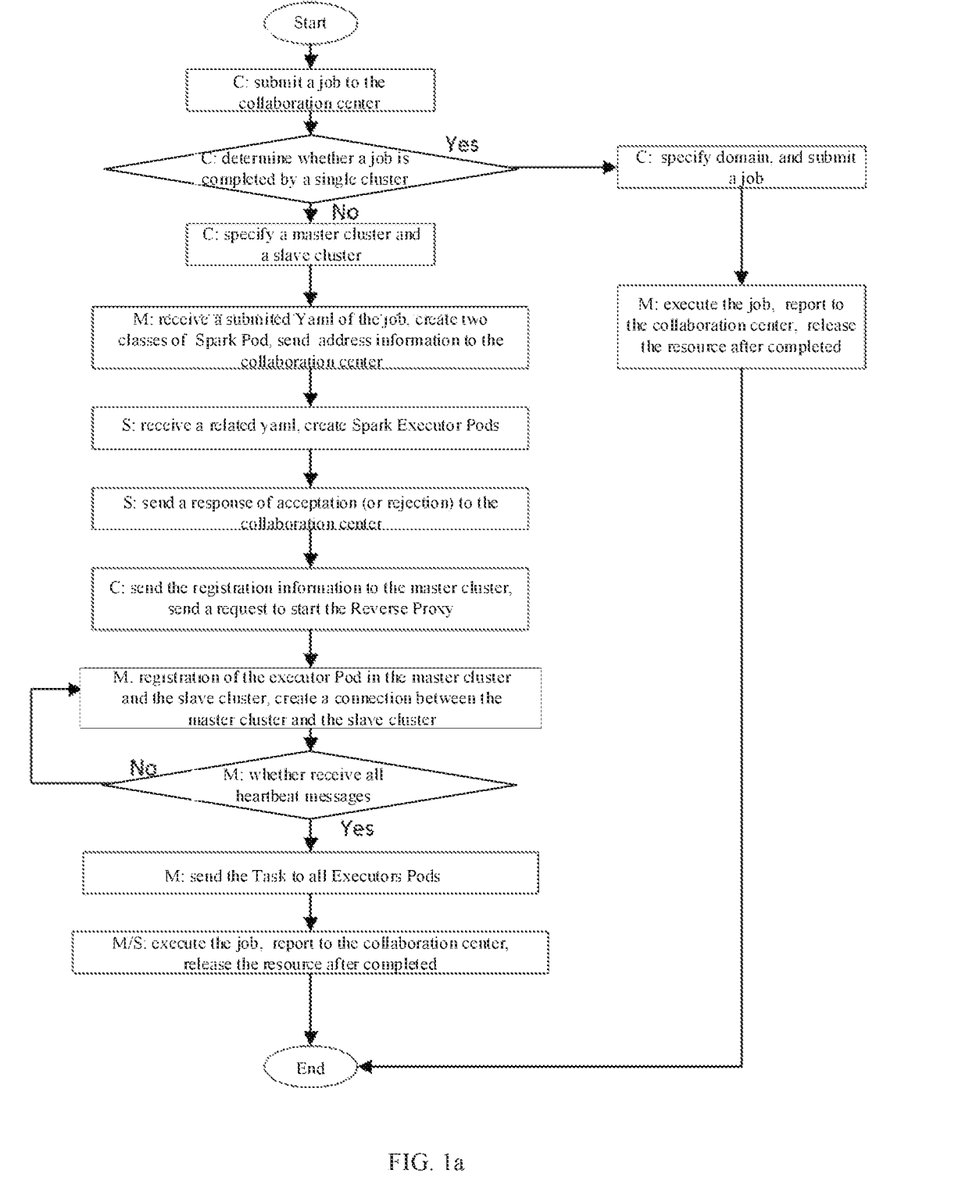
FIG. 1a is an architectural diagram of a method of executing a collaborative job for Spark faced to multiple K8s clusters according to embodiments of the present disclosure.
Figure 1B:
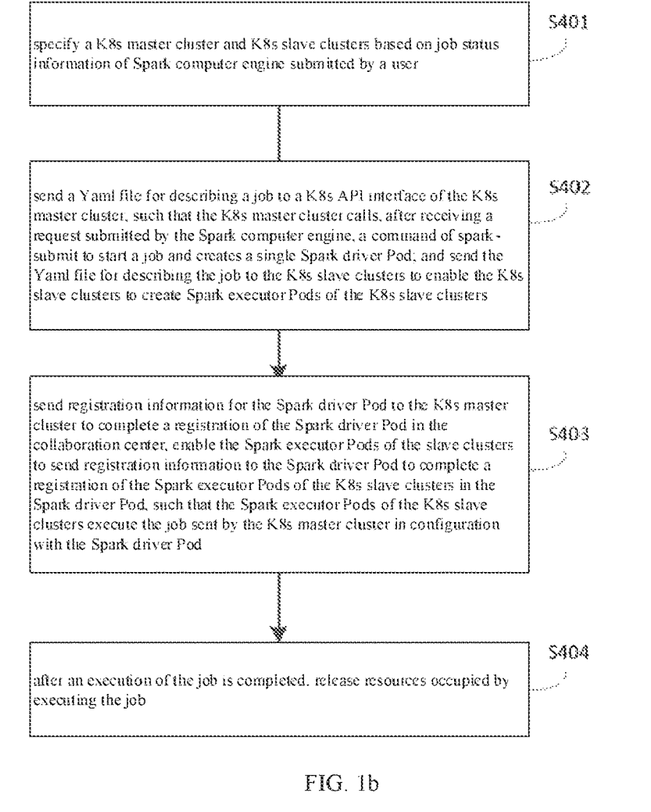
FIG. 1b is a flowchart of a method of executing a collaborative job for Spark faced to multiple K8s clusters according to the present disclosure.

As shown in FIGS. 1a and 1b, in the present disclosure, a method of executing a collaborative job for Spark faced to multiple K8s clusters is provided, which is an Operator tool built by a Kubernetes API (Application Programming Interface) resource and is used to manage and monitor applications deployed. The Operator can be regarded as a mode for solving containerization problems about complex applications. Utilizing the Operator's custom applications and assemblies thereof for managing resources, users can create, configure, and manage the complex stateful application. The Operator follows the design philosophy of the declarative API and the Controller of the Kubernetes and is used to extend the Kubernetes API. The Operator is built with the concept of the resources and controllers for Kubernetes, and further incorporates knowledge in specific domain of the Spark. According to the embodiments of the present disclosure, the method of executing a collaborative job for Spark faced to multiple K8s clusters includes processes, such as, an establishment of a communication tunnel across clusters, a creation of a Driver Pod of a master cluster, a creation of an Executor Pod of a slave cluster, a registration of an Executor Pod of the slave cluster, a distribution of jobs from the Driver Pod of the master cluster, etc. In FIG. 1a, C represents a collaboration center, which may be implemented by one or more computers; M represents a K8S master cluster or K8S single cluster; and S represents a K8S slave cluster. The K8S master cluster may be implemented by one or more computers, the K8S single cluster may be implemented by one or more computers, and the K8S slave cluster may be implemented by one or more computers. In the embodiments of the present disclosure, the method of executing a collaborative job for Spark faced to multiple K8s clusters may include the following steps.

At the step S1, a user's Spark application is submitted to the collaboration center.

At the step S2, the collaboration center, based on a policy and computing resources selected by the user and status information of data storage, determines whether the job is completed by the K8S single cluster; if yes, the collaboration center selects an appropriate K8S single cluster to deploy the current Spark application; if multi-cluster collaborative completion is required, jump to step S3.

At the Step S3, the collaboration center specifies a K8S master cluster and one or more K8S slave clusters based on the user-selected policy, computing resources, and the status of data storage.

Specifically, the step S3 may include establishing a cross-cluster communication tunnel.

In some embodiments, the cross-cluster communication tunnel may be built by using a routing table mechanism and a VxLan (Virtual eXtensible LAN) mechanism. By building VTEP (VXLAN Tunnel End Point) which is also known as start and end points of the VxLan tunnel at the Pod, the encapsulation mechanism for different users is built through VNI (Virtual Network Infrastructure), and thus a safe communication is achieved. The process of sending messages based on VxLan is shown below.

Start
Input: message (Msg) to be sent across the domain
Output: status of successful or failed for creation
SetIPTableRule(TargetIP) #Set the routing table rules and the message arrives at the VTEP start point
Packet=SetupIpOverIP(Msg) #Build IP over IP message
SendPacket(Package) #Send to the VTEP end point of destination cluster
Msg=GetOriginalIP(Package) #Recover IP message to send to the container
Status=GetStatus( ) #Obtain the communication status
End At the step S4, the collaboration center submits the Yaml (YAML Ain't Markup Language) file of the job description to an API (Application Programming Interface) Server of the master cluster, and the master cluster receives the request submitted by the Spark and calls spark-submit to start the job, and establishes the Spark Driver Pods and the Spark Executor's Pods; the master cluster sends address information and certificate information of the two types of Pods to the collaboration center. In FIG. 1a, the two types of Spark Pods (i.e., Spark Driver Pods and Spark Executor's Pods) are established, i.e., the master cluster establishes the driver Pod and the executor Pods of the master cluster. The Pod is the smallest unit of k8s, and containers are contained in the Pod, i.e., the Pod is a set of containers.

For the creation of the Driver Pods of the master cluster, the Driver Pods of the master cluster is created based on the client-mechanism of K8s. The client communicates with the API Server of the master cluster and inputs parameters to complete the creation process of the Driver Pod. The client is actually the client of HTTPS (Hypertext Transfer Protocol Secure), and the API Server is actually responsible for the Pod creation, the deletion, the container creation, etc. If the controller wants to complete these actions, it needs to create HTTPS and sends a request to the API Server. The creation process of a client mechanism based on K8s is shown as follows:

Start
Input: the configuration of the Driver container, the configuration of the Driver Pod
Output: Status of successful or failed for the creation
Driver Container=CreateContainer( ) #Build the container parameters for building the container
DriverPod=CreatePod( ) #Build the pod parameters for Building the Pod
Sid=SerializeSend(DriverContainer, DriverPod) #Serialize and send the API Server
Wait until stopped or failed
Status=GetStatus( ) #Get creation status
End At the step S5, the slave cluster receives a job description information (described in Yaml file), creates Spark Executor Pods, and sends a response of acceptation (or rejection) to the collaboration center.

The process of creating the Executor Pods of the slave cluster is similar to the process of creating the Driver Pods of the master cluster. The slave cluster gets the configuration information and the container of the Executor Pod from the collaboration center and creates the corresponding Executor Pod.

Start
Input: the instruction of creating the Executor Pod and the container
Output: the status of successful or failed for creation
Arg=GetArgument( ) #Get the Executor Pod parameters from the Collaboration Center
DriverContainer=CreateContainer( ) #Build the container parameters for building the container
DriverPod=CreatePod( ) #Build the pod parameters for Building the Pod
Sid=SerializeSend(DriverContainer, DriverPod) #Serialize and send the API Server
Wait until stopped or failed
Status=GetStatus( ) #Get creation status
End At the step S6, the collaboration center receives the registration information for the Spark Driver Pod from the master cluster and sends a request to start the Reverse Proxy. The collaboration center sends the registration information for the Spark Driver Pod to the master cluster to complete the registration of the Spark Driver Pod in the master cluster and/or the collaboration center.

At this time the number of the Executors for this job is determined by the Driver Pod. The Reverse Proxy is enabled by the deployed Reverse Proxy.

At the step S7, the slave cluster sends address information and certificate information to the master cluster to connect with the Reverse Proxy of the master cluster. If the connection is successful, the slave cluster sends the registration information for Executor Pods to the master cluster and sends a heartbeat message to the master cluster.

At the step S8, the master cluster determines whether the registration information and heartbeat messages of all Executor Pods are received. If yes, the connection is successful, and skip to the step S9, if no, continue waiting.

Specifically, the registration of the Executor container of the slave cluster includes that: after the executor Pods of the slave cluster are successfully created, the containers in the Executor Pods of the slave cluster confirm the establishment of the communication link with the Driver Pod by sending heartbeat messages to the Driver container. The resource information and access credentials of the container are sent to the Driver Pod to complete the registration of Executor Pods in the Driver Pod.

Start input: send a registration command to the Driver
Output: the status of successful or failed for registration
Resource=GetResource( ) #Get the static resource configuration of the container itself
Credentials=GetCredentials( ) #Get the access credentials of the container
Driver=GetDriver( ) #Get the Url of the Driver
SendHeartbeat(Driver) #Send the heartbeat message
Sid=SerializeSend(Driver, Resource, Credentials) #Serialize the resource and the credential information and send to the Driver
Wait until stopped or failed
Status=GetStatus( ) #Get the registration completion status
End At the step S9, the master cluster sends a job (task) to all Executor Pods of the slave cluster.

Specifically, the assignment and the scheduling of the task by the Driver container of the master cluster includes that: after the executor Pod of the slave cluster is successfully registered, the Driver of the master cluster enters the process of assigning the task. Since the data stored in different clusters varies, the task (job) is assigned and scheduled based on the storage location of the data as much as possible.

Start
Input: command of starting assignment of task
Output: assignment success or video status
Task=Get Task( ) #The Driver Gets the task
Executors=GetExecutors( ) #The Driver gets the list of the Executor container
For exe in Executors #For each container
GetCredential(exe) #Get access credentials
SerializeSend(exe, job, Credential) #The task is serialized and is sent to the Executor container
Wait until stopped or failed
Status=GetStatus( ) #Get access status
End At the step S10, the master cluster and the slave clusters start executing the job under the configuration of the Driver, and if the job is completed, the collaboration center notifies to release resources.

Figure 2:
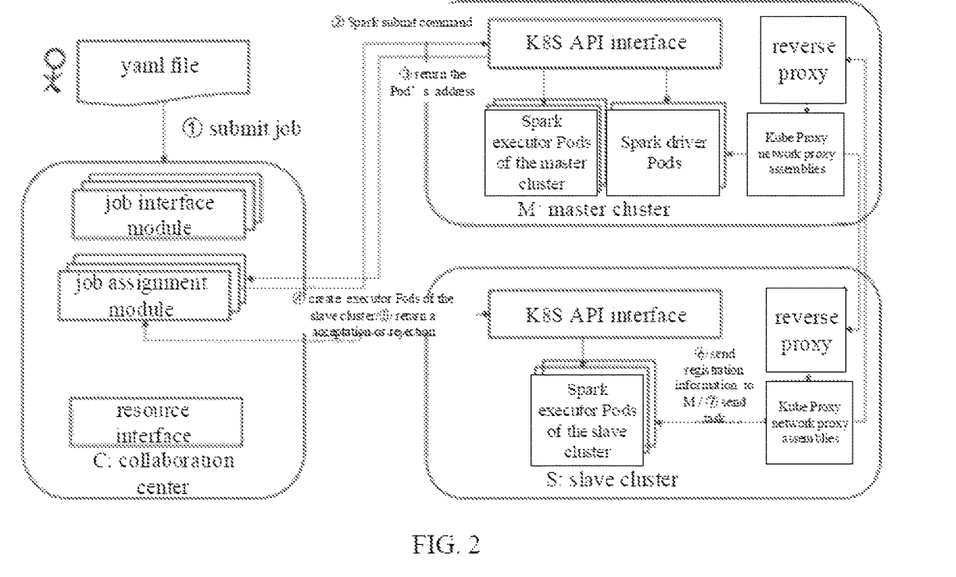
FIG. 2 is a schematic diagram of an apparatus of executing a collaborative job for Spark faced to multiple K8s clusters according to the embodiments of the present disclosure.

As shown in FIG. 2, an apparatus of executing a collaborative job for Spark faced to multiple K8s clusters includes a job interface module, a job assignment module, and a resource interface module, where the job assignment module includes a K8s cluster designation module, a Yaml job description file sending module, registration information sending module and a resource releasing module.

The job interface module is configured to obtain a job submitted by a user.

The K8s cluster designation module is configured to specify a K8s master cluster and K8s slave clusters based on job status information of Spark computer engine submitted by the user.

The Yaml job description file sending module is configured to send a Yaml file for describing a job to the K8s API interface of the K8s master cluster, such that the K8s master cluster calls, after receiving a request submitted by the Spark computer engine, a command of spark-submit to start the job, such that a single Spark driver Pod of the master cluster and a group of Spark executor Pods of the slave clusters are created, addresses of Spark driver Pod and Spark executor Pod are feedback; and send the Yaml file for describing the job to the K8s slave clusters to enable the K8s slave clusters to create Spark executor Pods.

That a single Spark Driver utilizes computing resources from different Kubernetes clusters to complete the computing job is realized, unlike the implementation method based on Kubernetes Fed, this method does not generate multiple Spark Drivers and enables the resources of multiple clusters to be transparent to Spark's computing process. The Kube Proxy in FIG. 2 is a web proxy for a scheduling-arranging-platform of the Kubernetes container.

The registration information sending module is configured to receive the registration information for the Spark driver Pod from the K8s master cluster to complete a registration of the Spark driver Pod in the collaboration center, enable the K8s slave clusters to send registration information to the registered Spark driver Pod to complete a registration of the Spark executor Pods in the Spark driver Pod, such that the registered Spark executor Pods of the slave clusters execute the job sent by the K8s master cluster in configuration with the Spark driver Pod.

The resource releasing module is configured to release resources occupied by executing the job, after an execution of the job is completed.

The resource interface module is configured to obtain statuses for resources of respective clusters.

Figure 3:
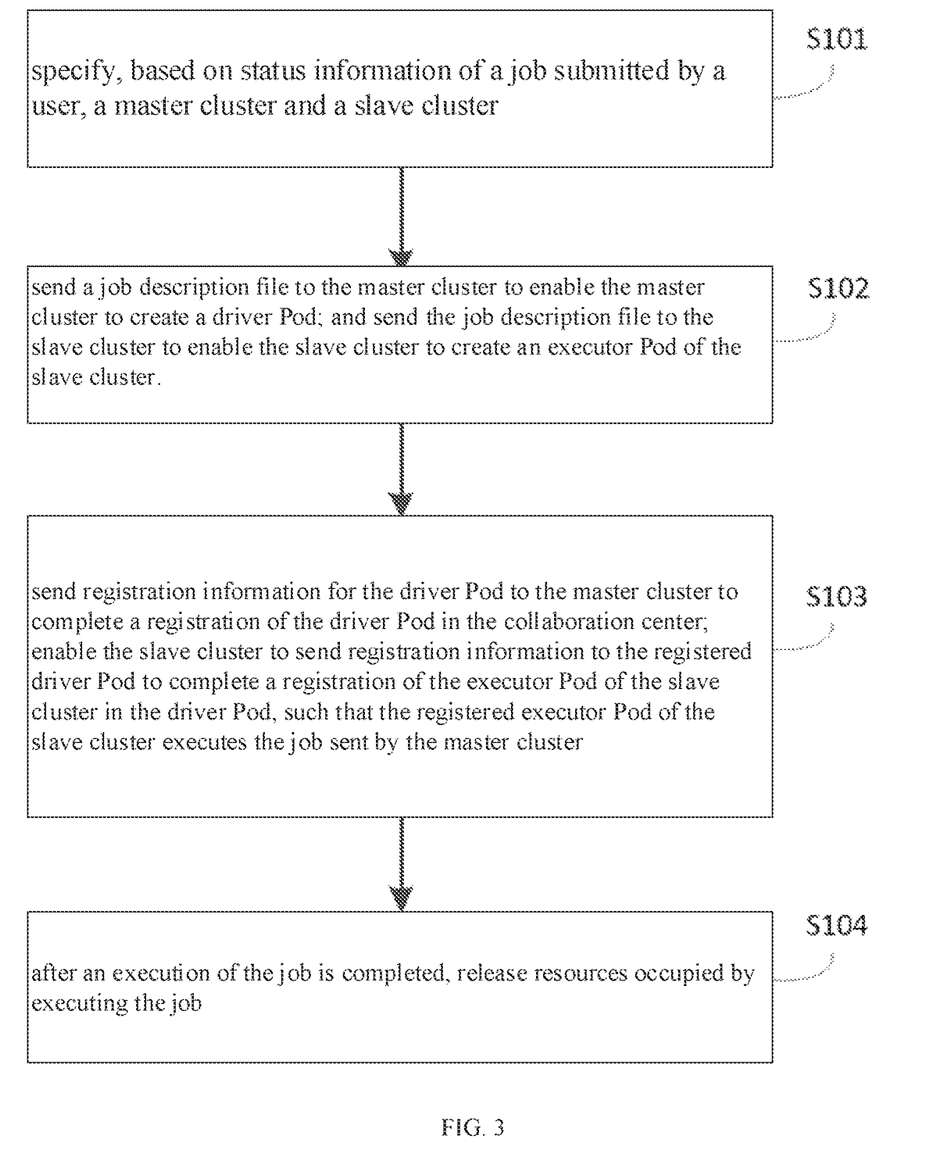
FIG. 3 is a flowchart of a method of executing a collaborative job faced to multiple clusters, which is applied to a collaboration center, according to the present disclosure.

As shown in FIG. 3, a method of executing a collaborative job faced to multiple clusters, applied to the collaboration center, includes the following steps.

At the step S101, based on status information of a job submitted by a user, a master cluster and a slave cluster are specified.

The job is a set of works that a user requires a computing system to do in a single solution or a transaction process, which includes user programs, required control commands for data sets, etc. The job is composed of a series of sequential steps, and computation and storage in multiple network nodes may be involved in the execution of the job. The job status information includes the user-selected policy and computing resources, status information of data storage, etc.

The collaboration center determines whether a single cluster operates based on the job status information submitted by the user, and in response to determining that a single cluster operates, the collaboration center selects a single cluster to execute the job and releases resources occupied after the job is completed, and in response to determining that two or more clusters operate, the collaboration center specifies the master cluster and the slave cluster, and executes the step S102.

At the step S102: a job description file is sent to the master cluster to enable the master cluster to create a driver Pod; and the job description file is sent to the slave cluster to enable the slave cluster to create a group of executor Pods of the slave cluster. The group of executor Pods of the slave cluster includes one or more executor Pods of the slave clusters. Optionally, the group of executor Pods of slave cluster includes a plurality of executor Pods of the slave cluster, and the plurality of executor Pods of slave cluster may be established by one or more slave clusters.

After a job description file is submitted to the master cluster to enable the master cluster to start the job, the executor Pod of the master cluster is also established.

At the step S103, registration information for the driver Pod of the master cluster is received to complete a registration of the driver Pod in the collaboration center; enable the slave cluster to send registration information to the registered driver Pod to complete a registration of the executor Pod of the slave cluster in the driver Pod, such that the registered executor Pod of the slave cluster executes the job sent by the master cluster.

After receiving the registration information for the driver Pod of the master cluster to complete a registration of the driver Pod in the collaboration center, the executor Pod of the master cluster is further enabled to send registration information to the registered driver Pod to complete a registration of the executor Pod of the master cluster in the driver Pod, such that the registered executor Pod of the master cluster executes the job sent by the master cluster.

The collaboration center further sends a reverse proxy (the Reverse Proxy as shown in FIG. 1a) start request to the master cluster while the collaboration center sends the registration information for the driver Pod to the master cluster, and based on feedback information established by the executor Pod of the slave cluster, enables the driver Pod to determine establishment information of the executor Pod of the slave cluster to enable a reverse proxy unit, such that the slave cluster sends address information and credentials information of the executor Pod of the slave cluster to connect with the reverse proxy unit of the master cluster; and in response to determining that the slave cluster connects successfully with the reverse proxy unit of the master cluster, the executor Pod of the slave cluster sends the registration information to the driver Pod to complete the registration of the of executor Pod of the slave cluster in the driver Pod.

A user-defined protocol is implemented based on the reverse proxy, such that the direct communication between multiple clusters across the domain in a single computing task is achieved, forwarding through a third party is avoided in this method, and the effective communication is achieved.

While the slave cluster is enabled to send registration information to the driver Pod, the slave cluster sends a heartbeat message to the master cluster, such that the master cluster determines whether connection between the master cluster and the slave cluster is successful based on the registration information of the slave cluster and the heartbeat message; where in response to determining that the master cluster receives the registration information for the group of executor Pods of the slave cluster and the heartbeat message, the connection is successful, and the job (the Task as show in FIG. 1) is sent; in response to determining that the master cluster does not receive at least one of the registration information for the group of executor Pods of the slave cluster or the heartbeat message, the connection is unsuccessful and continue waiting.

At the step S104, after an execution of the job is completed, resources occupied by executing the job are released.

The embodiment of this part of is similar to the embodiment of the method described above and will not be repeated herein.

Figure 4:
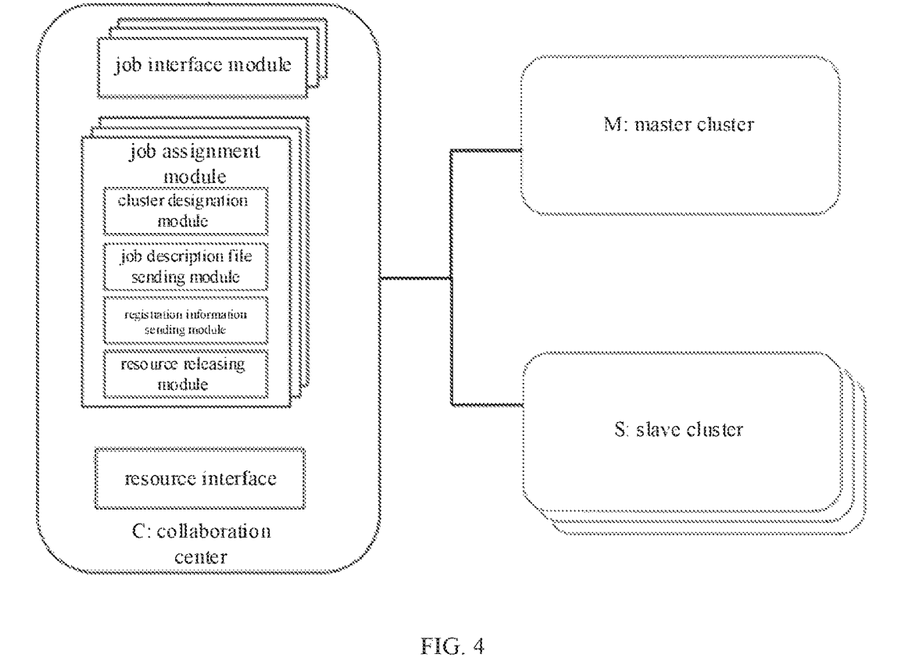
FIG. 4 is a schematic diagram of an apparatus of executing a collaborative job for Spark faced to multiple clusters according to the present disclosure.

As shown in FIG. 4, an apparatus of executing a collaborative job faced to multiple clusters includes a job interface module, a job assignment module, and a resource interface module, where the job assignment module includes a cluster designation module, a job description file dispatch module, a registration information dispatch module, and a resource release module.

The job interface module is configured to obtain a job submitted by a user.

The cluster designation module is configured to specify a master cluster and a slave cluster based on the job status information submitted by the user.

The job description file sending module is configured to send a job description file to the master cluster to enable the master cluster to create a driver Pod; and send the job description file to the slave cluster to enable the slave cluster to create an executor Pod of the slave cluster.

The registration information sending module is configured to receive registration information for the driver Pod of the master cluster to complete a registration of the driver Pod in a collaboration center; enable the slave cluster to send registration information to the registered driver Pod to complete a registration of the executor Pod of the slave cluster in the driver Pod, such that the executor Pod of the slave cluster executes the job sent by the master cluster.

The resource release module is configured to release resource occupied by executing the job, after an execution of the job is completed.

The resource interface module is configured to obtain statuses for resources of respective clusters.

The embodiment of this part of is similar to the embodiment of the apparatus described above and will not be repeated herein.

Figure 5:
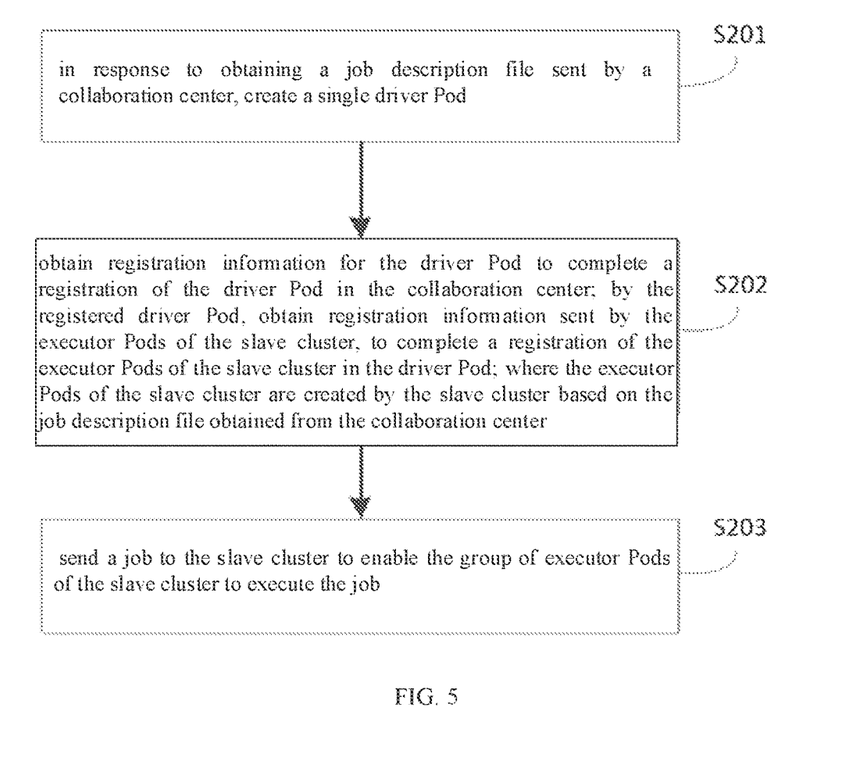
FIG. 5 is a flowchart of a method of executing a collaborative job faced to multiple clusters, which is applied to a master cluster, according to the present disclosure.

As shown in FIG. 5, a method of executing a collaborative job faced to multiple clusters, applied to the master cluster, includes the following steps.

At the step S201, in response to obtaining a job description file sent by a collaboration center, a driver Pod is created.

At the step S202, registration information for the driver Pod is sent to the collaboration center to complete a registration of the driver Pod in the collaboration center; by the registered driver Pod, registration information from the executor Pod of the slave cluster is obtained, to complete a registration of the executor Pod of the slave cluster in the driver Pod; where the executor Pod of the slave cluster are created by the slave cluster based on the job description file obtained from the collaboration center.

At the step S203: a job is sent to the registered slave cluster to enable the registered executor Pods of the slave cluster to execute the job.

The embodiment of this part of is similar to the embodiment of the method described above and will not be repeated herein.

Figure 6:
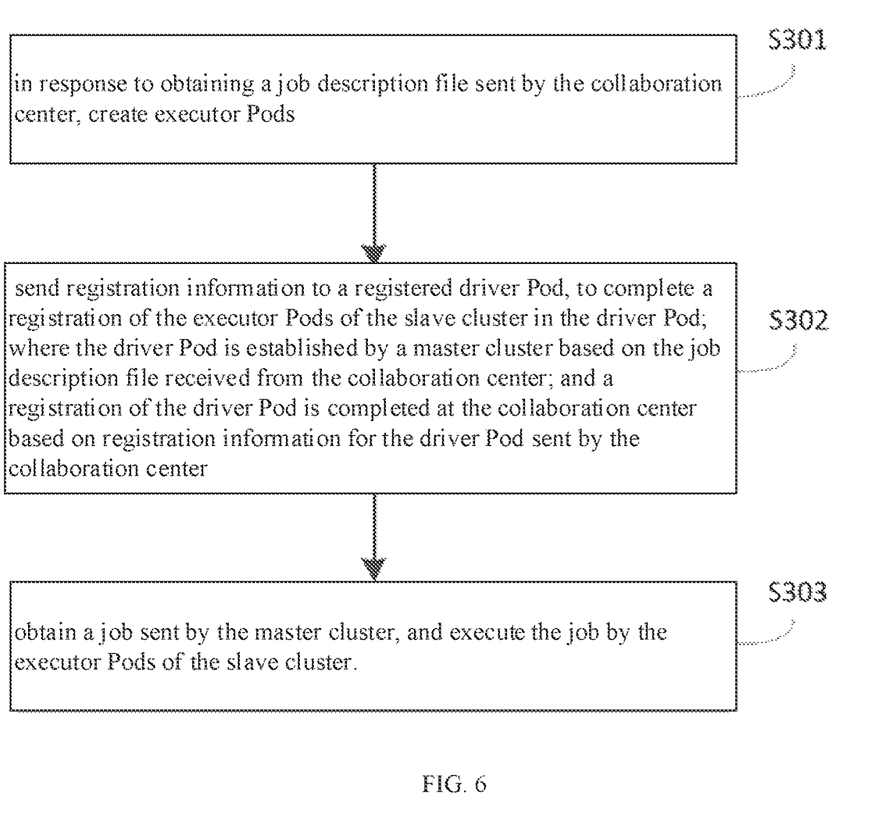
FIG. 6 is a flowchart of a method of executing a collaborative job faced to multiple clusters, which is applied to a slave cluster, according to the present disclosure.

As shown in FIG. 6, a method of executing a collaborative job faced to multiple clusters, applied to the slave cluster, includes the following steps.

At the step S301: in response to obtaining a job description file sent by the collaboration center, executor Pods are created.

At the step S302: registration information is sent to a registered driver Pod, to complete a registration of the executor Pods of the slave cluster in the driver Pod; wherein the driver Pod is established by a master cluster based on the job description file received from the collaboration center; and a registration of the driver Pod is completed at the collaboration center based on registration information for the driver Pod received by the collaboration center.

At the step S303: a job sent by the master cluster is obtained and the job is executed by the executor Pods of the slave cluster.

The embodiment of this part of is similar to the embodiment of the method described above and will not be repeated herein.

Corresponding to the foregoing embodiments of a method of executing a collaborative job faced to multiple clusters, the present disclosure also provides an embodiment of executing a collaborative job faced to multiple clusters.

Figure 7:
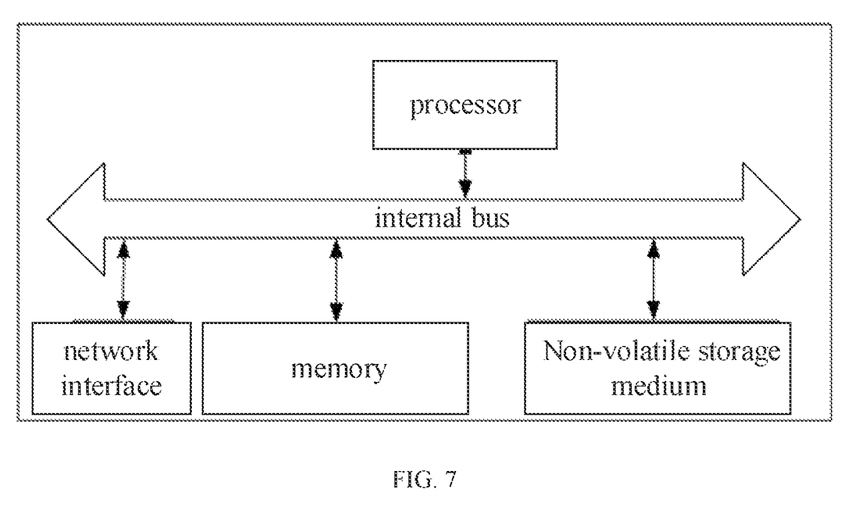
FIG. 7 is a schematic diagram of a device of executing a collaborative job faced to multiple clusters according to the present disclosure.

Referring to FIG. 7, in an embodiment of the present disclosure, a device of executing a collaborative job faced to multiple clusters is provided, including a memory and one or more processors, where the memory has executable code stored therein, the one or more processors executes the executable code for implementing the method of executing the collaborative job faced to multiple clusters of the above-described embodiment.

In the embodiment of the present disclosure, the device of executing a collaborative job faced to multiple clusters may be applied to any device with data processing capabilities, and any device with data processing capabilities may be a device or device such as a computer. The embodiment of device can be implemented by a software, a hardware or a combination of the hardware and the software. Taking implementing by software as an example, as a device in the logical sense, through the processor of any device with data processing capabilities, this device is formed by reading the corresponding computer program instructions in the non-volatile memory into the memory and running the computer program instructions. From the perspective of hardware, as shown in FIG. 7, it is a hardware structure diagram of any device with data processing capability where a device for a cooperative job faced multiple clusters is located. In this embodiment, except for the processor, memory, the network interface and the non-volatile memory, any device with data processing capability, where the device is located, usually based on the actual function of any device with data processing capability, may also include other hardware, which will not be repeated herein.

The process of implementing the functions and effects of each unit in the device is described in detail in the process of implementing the corresponding steps in the method and will not be repeated herein.

For the device embodiment, since it basically corresponds to the method embodiment, it is sufficient to refer to the method embodiment for the relevant part of the description. The device embodiment described herein is merely schematic, where the units described as separate components may or may not be physically separated, and the components displayed as units may or may not be physical units, i.e., they may be located in one place or may be distributed to multiple network units. Some or all of these modules can be selected according to practical needs to achieve the purpose of solution of the present disclosure. It can be understood and implemented by those of ordinary skill in the art without creative labor.

In the embodiments of the present disclosure, a computer-readable storage medium stored a program is further provided, the program is executed by a processor to implement the methods of executing the collaborative job faced to multiple clusters of the embodiments herein.

The computer-readable storage medium may be an internal storage unit, such as a hard disk or memory, of any device with data processing capability as described in any of the embodiments herein. The computer-readable storage medium may also be an external storage device of any device with data processing capability, such as a plug-in hard disk, Smart Media Card (SMC), SD card, Flash Card, etc., equipped on the device. Further, the computer-readable storage medium may also include both internal storage units and external storage devices of any device with data processing capability. The computer-readable storage medium is used to store the computer programs and other programs and data required by any device with data processing capability or may be used to temporarily store data that has been output or will be output.

The above embodiments are used only to illustrate the technical solutions of the present disclosure rather than to limit them. Although the present disclosure is described in detail with reference to the embodiments herein, it should be understood by those of ordinary skill in the art that it is still possible to modify the technical solutions recorded in the embodiments herein, or to make equivalent substitutions for some or all of the technical features thereof: and these modifications or substitutions do not make the essence of the corresponding technical solutions of the embodiments of the present disclosure out of the scope of the technical solutions of the present disclosure.

The invention claimed is:

1. A method of executing a collaborative job faced to multiple clusters, applied to a collaboration center, comprising:
   step S101: specifying, based on status information of a job submitted by a user, a master cluster and a slave cluster;
   step S102: sending a job description file to the master cluster to enable the master cluster to create a single driver Pod; and sending the job description file to the slave cluster to enable the slave cluster to create a group of executor Pods of the slave cluster;

step S103: sending registration information for the driver Pod to the master cluster to complete a registration of the driver Pod in the collaboration center; enabling the slave cluster to send registration information for the group of executor Pods of the slave cluster to the driver Pod to complete a registration of the group of executor Pods of the slave cluster in the driver Pod, such that the group of executor Pods of the slave cluster executes the job sent by the master cluster;

wherein the collaboration center further sends a reverse proxy start request to the master cluster while the collaboration center sends the registration information for the driver Pod to the master cluster, and based on feedback information established by the group of executor Pods of the slave cluster, the collaboration center enables the driver Pod to determine establishment information of the group of executor Pods of the slave cluster to enable a reverse proxy unit, such that the slave cluster sends address information and credentials information of the group of executor Pods of the slave cluster to connect with the reverse proxy unit of the master cluster; and in response to determining that the slave cluster connects successfully with the reverse proxy unit of the master cluster, the slave cluster sends the registration information for the group of executor Pods of the slave cluster to the driver Pod to complete the registration of the group of executor Pods of the slave cluster in the driver Pod; and step S104: after an execution of the job is completed, releasing resources occupied by executing the job.

2. The method according to claim 1, wherein in the step S101, the collaboration center determines whether a single cluster operates based on the job status information submitted by the user, and in response to determining that a single cluster operates, the collaboration center selects a single cluster to execute the job and releases resources occupied after the job is completed, and in response to determining that two or more clusters operate, the collaboration center specifies the master cluster and the slave cluster, and executes the step S102.

3. The method according to claim 1, wherein the step S102 further comprises: after sending the job description file to the master cluster to enable the master cluster to create the single driver Pod, enabling the master cluster to establish an executor Pod of the master cluster; and the step S103 further comprises: after sending the registration information for the driver Pod to the master cluster to complete the registration of the driver Pod in the collaboration center, enabling the executor Pod of the master cluster to send registration information for the executor Pod of the master cluster to the driver Pod to complete a registration of the executor Pod of the master cluster in the driver Pod, such that the executor Pod of the master cluster executes the job sent by the master cluster.

4. The method according to claim 1, wherein the step S103 further comprises: while enabling the slave cluster to send registration information for the group of executor Pods of the slave cluster to the driver Pod, enabling the slave cluster to send a heartbeat message to the master cluster, such that the master cluster determines whether connection between the master cluster and the slave cluster is successful based on the registration information for the group of executor Pods of the slave cluster and the heartbeat message; wherein in response to determining that the master cluster receives the registration information for the group of executor Pods of the slave cluster and the heartbeat message, the connection between the master cluster and the slave cluster is successful, and the master cluster sends the job to the slave cluster; in response to determining that the master cluster does not receive at least one of the registration information for the group of executor Pods of the slave cluster or the heartbeat message, the connection is unsuccessful and continue waiting.

5. A device of executing a collaborative job faced to multiple clusters, comprising one or more memories and one or more processors, wherein one or more executable codes stored in the one or more memories are executed by the one or more processors to implement the method according to claim 1.

6. A non-transitory computer-readable storage medium, wherein a program stored in the non-transitory computer-readable storage medium is executed by at least one processor to implement the method according to claim 1.

7. A method of executing a collaborative job faced to multiple clusters, applied to a master cluster, comprising:
   step S201: in response to obtaining a job description file sent by a collaboration center, creating a single driver Pod;
   step S202: obtaining registration information for the driver Pod to complete a registration of the driver Pod in the collaboration center; by the driver Pod, obtaining registration information for a group of executor Pods of a slave cluster sent by the group of executor Pods of the slave cluster, to complete a registration of the group of executor Pods of the slave cluster in the driver Pod; wherein the group of executor Pods of the slave cluster are created by the slave cluster based on the job description file obtained from the collaboration center;
   wherein the master cluster further obtains a reverse proxy start request while the master cluster obtains the registration information for the driver Pod; and based on feedback information established by the group of executor Pods of the slave cluster, the driver Pod is enabled to determine establishment information of the group of executor Pods of the slave cluster to enable a reverse proxy unit; such that the slave cluster sends address information and credentials information of the group of executor Pods of the slave cluster to connect with the reverse proxy unit of the master cluster; in response to determining that the slave cluster connects successfully with the reverse proxy unit of the master cluster, the slave cluster sends the registration information for the group of executor Pods of the slave cluster to the driver Pod to complete the registration of the group of executor Pods of the slave cluster in the driver Pod; and
   step S203: sending a job to the slave cluster to enable the group of executor Pods of the slave cluster to execute the job.

8. A method of executing a collaborative job faced to multiple clusters, applied to a slave cluster, comprising:
   step S301: in response to obtaining a job description file sent by the collaboration center, creating a group of executor Pods;
   step S302: sending registration information to a driver Pod, to complete a registration of the group of executor Pods of the slave cluster in the driver Pod; wherein the driver Pod is established by a master cluster based on the job description file received from the collaboration center; and a registration of the driver Pod is completed at the collaboration center based on registration information for the driver Pod sent by the collaboration center to the master cluster;

wherein based on a feedback information established by the group of executor Pods of the slave cluster when the collaboration center sends a reverse proxy start request to the master cluster, the group of executor Pods of the slave cluster enables the driver Pod to determine establishment information of the group of executor Pods of the slave cluster to enable the reverse proxy unit, the slave cluster sends address information and credential information of the executor Pods of the slave cluster to connect with the reverse proxy unit of the master cluster, and in response to determining that the slave cluster connects successfully with the reverse proxy unit of the master cluster, the slave cluster sends registration information to the driver Pod to complete a registration of the group of executor Pods of the slave cluster in the driver Pod; and step S303: obtaining a job sent by the master cluster, and executing the job by the group of executor Pods of the slave cluster.

* * * * *